United States Patent [19]
Tsuji et al.

[11] Patent Number: 5,752,195
[45] Date of Patent: *May 12, 1998

[54] CORDLESS TELEPHONE TERMINAL

[75] Inventors: Bruce H. Tsuji, Nepean; Susan J. McGarry, Ottawa; Steven W. Sparksman, Calgary, all of Canada

[73] Assignee: Northern Telecom Limited, Montreal, Canada

[*] Notice: The term of this patent shall not extend beyond the expiration date of Pat. No. 5,581,599.

[21] Appl. No.: 758,887

[22] Filed: Dec. 2, 1996

Related U.S. Application Data

[63] Continuation of Ser. No. 175,534, Dec. 30, 1993, Pat. No. 5,581,599.

[51] Int. Cl.$^6$ .................................................. H04R 7/32
[52] U.S. Cl. ...................... 455/462; 455/415; 455/566; 379/142
[58] Field of Search .................... 455/405, 414, 455/415, 462, 550, 564, 566; 379/127, 142

[56] References Cited

U.S. PATENT DOCUMENTS

| | | |
|---|---|---|
| 5,063,588 | 11/1991 | Patsiokas et al. . |
| 5,077,832 | 12/1991 | Szczutkowski et al. . |
| 5,121,423 | 6/1992 | Morihiro et al. . |
| 5,285,493 | 2/1994 | Wagai et al. . |
| 5,297,203 | 3/1994 | Rose et al. . |
| 5,371,788 | 12/1994 | Baals et al. . |
| 5,425,077 | 6/1995 | Tsoi . |
| 5,581,599 | 12/1996 | Tsuji et al. .............................. 455/415 |

FOREIGN PATENT DOCUMENTS 62-23266   1/1987   Japan .

*Primary Examiner*—Dwayne Bost
*Assistant Examiner*—William G. Trost
*Attorney, Agent, or Firm*—Michael M. Sakovich

[57] ABSTRACT

An interactive cordless telephone handset having an alphanumeric data display system is in radio communication with an associated base station to which voice and data signals are conducted over a telephone line. Received caller identification data is tested for validity and is stored in a limited storage Callers List memory of the base station if found valid. Subsequently, the data is transmitted to the handset over a radio link of limited range, with the received data being formatted and conducted to a display screen for identifying the caller by name and telephone number prior to answering the call. Although caller identification is erased from the display after the call, it is retained in the Callers List memory of the base station where it may be accessed by the handset via softkeys and dedicated dialpad keys for subsequent display and editing and optional transfer to a general directory for long term storage in a non-volatile memory of the base station.

20 Claims, 12 Drawing Sheets

CORDLESS TELEPHONE TERMINAL

CROSS REFERENCE TO A RELATED APPLICATION

This application is a continuation of application Ser. No. 08/175,534 filed Dec. 30, 1993, by Bruce H. Tsuji, Susan J. McGarry and Steven W. Sparksman, now U.S. Pat. No. 5,581,599.

FIELD OF THE INVENTION

The present invention relates to a cordless portable telephone terminal and to its method of operation wherein subscriber terminal functions and telephony features are selectively displayable on an interactive handset.

BACKGROUND OF THE INVENTION

Cordless telephones have proven to be popular in domestic, business and industrial environments due to their unrestricted freedom of movement. A telephone subscriber is therefore not confined by the limitation of a station set extension cord. Instead, the subscriber has complete freedom of movement within a radio link range of up to about 300 m between a stationary base and its cordless portable handset.

Coextensive with cordless telephones, enhanced telephone services in both analog voice and data communications are presently available which support a broad range of applications in the same network. Utilizing currently available digital technology to its fullest extent preferably requires an alphanumeric display for transient and stored data. A typical example is a directory of names and telephone numbers stored in a memory of a conventional subscriber terminal and shown on a liquid crystal display (LCD). In known telephone station apparatus having such a display and which is directly connected to a local telephone company switching office by way of a telephone line over which voice and data signals are transmitted, data displays present no problems and indeed are quite common. Such apparatus is typified in U.S. Pat. No. 4,924,496 Figa et al, issued May 8, 1990, the disclosure of which is included herein by reference.

A problem arises, however, in a cordless telephone handset not having an all-function display which, heretofore, appears to have been the norm. It is readily apparent, therefore, that the full potential of a cordless telephone is severely impeded either by the absence of a handset display or with a display having limited functional capabilities. Although the problem is alleviated by providing a display in the base station, it is exacerbated when the handset is remotely located, away from convenient access to the information provided by the display at the base.

SUMMARY OF THE INVENTION

Having regard to the aforedescribed problem relating to data displays in a cordless telephone subscriber terminal, a principal objective of the present invention is to provide a digital data display in the cordless handset.

A further provision of the invention establishes a continuous radio link between the base and the handset for both voice and data signals.

Another provision of the invention is a data display in which voice and data signals occupy a common communications channel.

Still another provision of the invention is a cordless telephone subscriber terminal which functions in a full duplex mode.

Yet another provision of the invention is apparatus and corresponding software that supports a directory name display, calling line identification (CLID) and a list of all incoming callers.

Another provision of the invention is apparatus and corresponding software adapted to provide a continuous, circular display of stored directory names and numbers.

The problem associated with the prior art may be substantially overcome and the foregoing provisions achieved by recourse to the invention which, in one aspect thereof, relates to apparatus for displaying data and processing appearances thereof from an alphanumeric display screen of a key operated cordless handset in user-interactive radio communication with an associated base station of a cordless telephone terminal in onhook communication with a telephone exchange, wherein said base station comprises a memory device, and wherein said memory device comprises first and second submemories. The apparatus comprises means for enabling first processor means at the handset for displaying keyed alphanumeric data on the screen and concurrently transmitting the alphanumeric data and commands to the base station, means for enabling second processor means at the base station for receiving the alphanumeric data and commands, retrievably storing the data in a first submemory of the base station and operably responding to the commands, means for capturing service data from an incoming telephone call received at the base station, means for retrievably storing the service data in a second submemory of the base station and concurrently transmitting the service data to the handset for display on the screen, and means for accessing individual ones of the first and second submemories via key operations at the handset for selectively processing and editorially revising the alphanumeric data stored in the submemories while under display screen observation.

Another aspect of the invention relates to a method for displaying data and processing appearances thereof from an alphanumeric display screen of a key operated cordless handset in user-interactive radio communication with an associated base station of a cordless telephone terminal in onhook communication with a telephone exchange, wherein said base station comprises a memory device, and wherein said memory device comprises first and second submemories. The method comprises the steps of enabling first processor means at the handset for displaying keyed alphanumeric data on the screen and concurrently transmitting the alphanumeric data and commands to the base station, enabling second processor means at the base station for receiving the alphanumeric data and commands, retrievably storing the data in a first submemory of the base station and operably responding to the commands, capturing service data from an incoming telephone call received at the base station, retrievably storing the service data in a second submemory of the base station and concurrently transmitting the service data to the handset for display on the screen, and accessing individual ones of the first and second submemories via key operations at the handset for selectively processing and editorially revising the alphanumeric data stored in the submemories while under display screen observation.

BRIEF DESCRIPTION OF THE DRAWINGS

The invention will now be more particularly described with reference to embodiments thereof shown, by way of example, in the accompanying drawings in which.

DETAILED DESCRIPTION OF THE PREFERRED EMBODIMENTS

Figure 1:
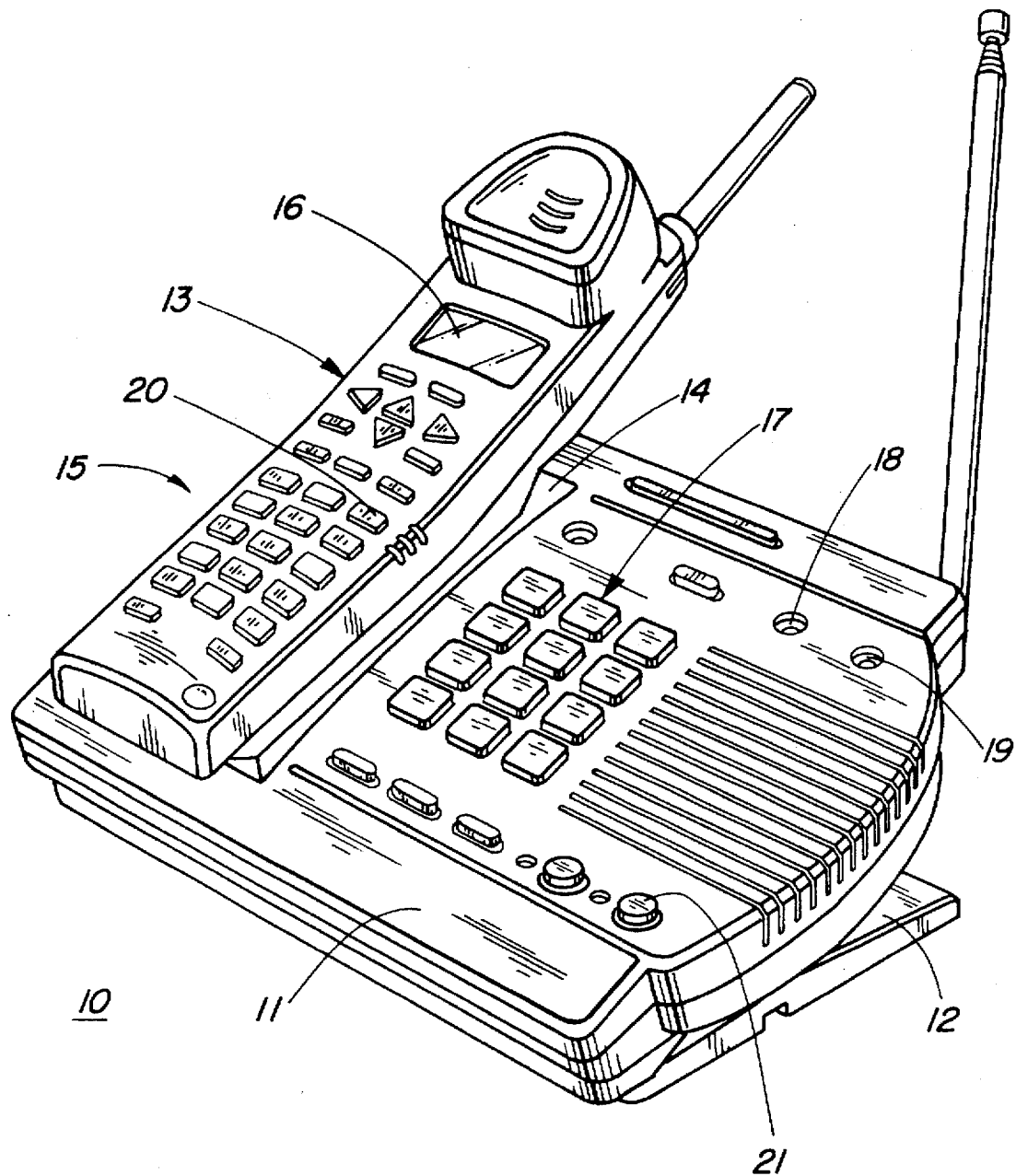
FIG. 1 is a perspective view of a cordless portable telephone terminal in accordance with the present invention.

FIG. 1 is a perspective view of a cordless portable telephone terminal 10 which, as will be described hereinbelow, is software configurable to provide enhanced telephone services in a voice and data communications network. The terminal 10 includes a base station, hereinafter referred to as a base 11, which is mounted at an acute angle on a supporting platform 12. This position is conducive to supporting a cordless handset 13 in a corresponding cradle 14 of the base. It will be observed that the handset 13 is advantageously positioned to provide convenient access to its dialpad 15, other function buttons which will be subsequently described in greater detail, and to a display screen 16. In the embodiment illustrated, the screen 16 provides a liquid crystal display (LCD) having three lines with a capacity of ten alphanumeric characters per line.

As well as having function keys related to the screen 16 on the handset, the base 11 includes a dialpad 17 and certain ones of function keys that correspond to like keys on the handset 13. Although not appearing in FIG. 1, it will be understood that an electrical connection for battery charging is established in a conventional manner by means of corresponding mating electrical contacts in the handset 13 and the cradle 14. Light emitting diodes (LEDs) on the base 11 indicate the charging state of the battery as well as the functional state of two subscriber features. Thus, an illuminated LED 18 labelled MESSAGES indicates that a voice message awaits the subscriber at a local telephone company message service when the subscriber is a participant of such service. Similarly, an illuminated LED 19 indicates to the subscriber that a new caller has been added to a callers list, a feature to be subsequently described in greater detail.

In effect, the base 11 may function as a separate telephone terminal, with or without the handset 13, by operating in a conventional speaker phone mode in which a speaker, not shown, of the base 11 functions conventionally in reproducing voice signals. A microphone, not shown, functions conventionally for generating voice signals.

The terminal 10 constantly monitors the level of battery voltage in the handset 13 via an A/D microprocessor port. When a preset low level is detected, the terminal 10 indicates the low battery condition by a display message on the screen 16. The battery low display message appears for 5 seconds for every state change until the battery dies or the handset is returned to the base for charging.

The terminal 10 maximizes the stand-by time of the battery by reverting to a battery saver mode after 45 seconds in the idle state. When in the battery save mode, the screen 16 is powered off, the LEDs are shut down (except New Callers which flashes with a lower duty cycle) and the microprocessor goes to sleep. The microprocessor awakens for 100 ms every 400 ms to ensure not missing any user keypress or alerting arriving to the base 11.

Figure 2:
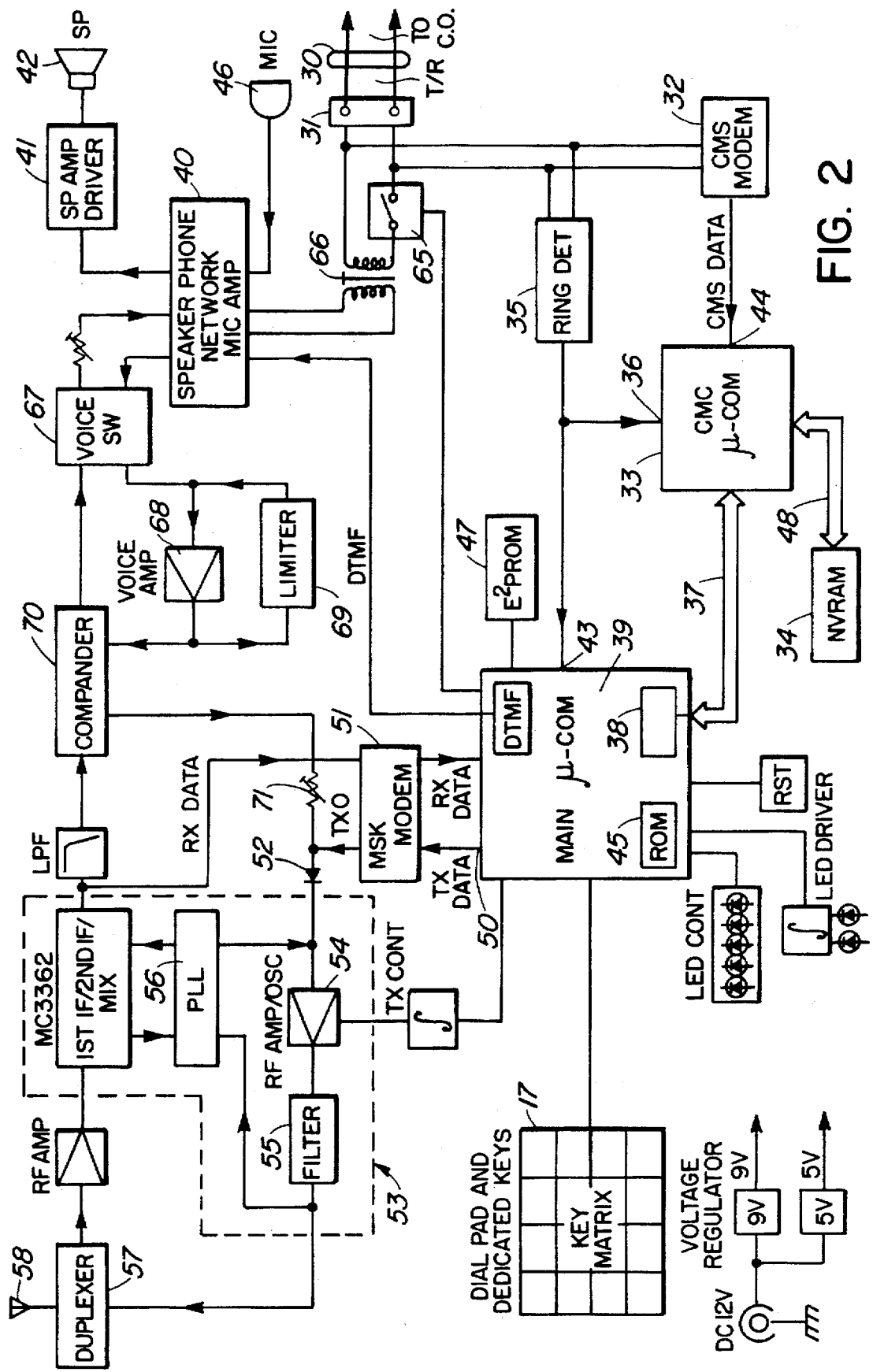
FIG. 2 is a block diagram of a cordless telephone base station shown in FIG. 1.

FIG. 2 is a detailed block diagram of the base 11 and shows signal paths for both voice, control and data signals together with various components that achieve a functional cordless telephone terminal in accordance with the invention. In this regard, it will be understood that the terminal 10 is intended to provide all contemporary telephone subscriber services to a user, including call waiting, call forwarding, and voice mail which are examples of subscriber services not requiring a visual display. More significantly, caller identification services are available to the subscriber through the screen 16 on which directory numbers and caller names may be shown.

The utility of the terminal 10 is even further enhanced by the screen 16 coupled with stand alone features that are provided by the terminal 10. Such stand alone features include predialing a number which is shown on the screen 16 before dialing to ensure that the dialed number is correct. Any dialed number as well as any identifiable answered or unanswered caller stored in a callers list, that includes directory numbers and corresponding names, may also be dialed using a softkey which initiates a call with a single key depression. Two softkeys are provided which effect operations via user interactive prompts that appear above the keys on the display 16. Examples of such operations will be described in greater detail in the description to follow.

The terminal 10 establishes a wired connection with a local telephone central office (CO) by means of a line 30 that comprises a twisted pair of conductors connected to a tip and ring terminal 31. Voice and data signals from the central office are input to the terminal 31, the voice signals being analog in form and the data signals comprising packet switch data with calling line and customer name identification.

As disclosed in co-pending U.S. patent application Ser. No. 07/733,027 filed in the names of Guy Chaput et al and assigned to Northern Telecom Limited, the disclosure of which is herein incorporated by reference, the particular feature of calling number identification (CNID) refers to a contemporary method and protocols of data transfers which are defined in Bellcore Technical References TR-TSY-00030 and TR-TSY-00031. Identification data is sent from the local telephone control office via frequency shift keying (FSK) from a Bell 202 modem per Bellcore TR-TSY-00030. Such data comprises a caller's name and number together with the current time and date. Essentially, the transfer of encoded identification data is received between the first and second ringing signals on the line 30. However, Message Waiting data can be transferred at any time that the terminal 10 is not active (i.e. on hook) and not necessarily between ring bursts.

A custom local area signalling services (CLASS) message servicing modem, shown in FIG. 2 as a modem 32, receives the FSK signals which are demodulated and output as class message servicing (CMS) data to an input 44 of a microprocessor 33 from which the data is retrievably stored in a nonvolatile NVRAM 34. Concurrently, an output from a ring detector 35 is coupled to a control port 36 to initiate a test to ascertain if the CMS data was corrupted during transmission. A bidirectional data bus 37 couples CMS output data from the microprocessor 33 to a data input register 38 of a main microprocessor 39. The same output from the ring detector 35 is coupled to a control port 43 of the microprocessor 39 wherein DTMF signals are generated and connected to a hybrid circuit 40. From this point the signals may be transmitted to the handset 13 or connected to the line 30.

A ROM 45 in the microprocessor 39 comprises firmware that controls the operation of both microprocessors 33 and 39 which run under software associated with this invention as described in greater detail hereinbelow. An EEPROM 47 contains data, namely directory data, call log data and factory programming data as examples. In accordance with such software control, a transmission data output 50 is connected to a minimum shift keying (MSK) modem 51. A typical MSK modem 51 is manufactured by Toshiba Corporation and is identified by part No. TC35470AF. The modem functions advantageously in either a full-duplex or half-duplex mode in a radio communications system for transmitting a control signal with sub-carrier frequency shift keying (FSK) modulation.

A modulated output signal from the modem 51 is coupled through a diode 52 to an input of a limited range frequency modulation (FM) transceiver 53 that includes a combined RF amplifier/oscillator module 54 having a controllable RF output in a frequency band of from 46 MHz to 49 MHz. The output from the module 54 feeds a notch filter 55 having a split output path. One path returns to the input of the module 54 by way of a phase lock loop 56 to effect modulation of the RF carrier. Software overlaying digital information on the RF carrier wave is performed in the modem 51. Digital information is done through frequency shift keying. As described, the signal goes through the phase lock loop 56 where it locks onto the carrier. In this way encryption is carried out in the phase lock loop. The second output path is coupled through a duplexer 57 to an antenna 58 from which a radio link is established with a corresponding antenna 59 in the handset 13.

All transmission messages within the protocol have checksum information included. If a data error occurs due to a poor RF condition, this checksum test fails and the error is detected. The user is notified of the error by a 5 second transient message on the screen 16, "Sorry Try Again".

It will be understood that the aforedescribed FSK signals are received, processed and transmitted from the base 11 even though the base and its handset 13 remain on hook. This is necessary for ascertaining a caller's identity by way of a directory number and/or caller name shown in the screen 16. Thus, a subscriber to CNID or calling line identification (CLID) would have a caller's identity established first, if available, so that the subscriber may choose to either receive or refuse the call.

When a call is received, and either the base 11 or its handset 13 goes offhook, a hook switch 65 is closed which completes a voice signal path from the terminal 31 to the primary winding of a line transformer 66. The output of the transformer 66 is coupled to the circuit 40 from which an analog voice signal is fed through the amplifier 41 to drive the speaker 42. A second voice signal output from the circuit 40 is coupled to a voice switch 67 and therefrom to an input of a voice amplifier 68 which is shown having a limiter 69 bridged thereacross for controlling wide signal swings through negative feedback. The output from the amplifier 68 is connected to a compander 70 from which an output is taken through a potentiometer control 71 to the diode 52. In the clear interval following ringing, the voice signals are coupled through the diode 52 to the transceiver 53 for transmission to the handset 13 in a like manner to the transmitted data previously described.

The modulated RF output signal from the base 11, bearing both voice and data signals, is received at the antenna 59 of the handset 13 and is connected to a duplexer 75 which directs the incoming signal to an RF amplifier 76 and therefrom to an input of an FM transceiver 77 which is functionally the same as the transceiver 53 of the base 11. The RF signal input to the transceiver 77 is processed by an RF module 78 which comprises a first IF/second IF/mixer. The module 78 is currently available as a commercial product from the Motorola Corporation and is identified under part No. MC 3362. It will be understood that the module 78 functions cooperatively with a phaselock loop module 79 which operates as a discriminator. The result is decryption of the encrypted data carried by the RF output signal from the base 11.

An audio output from the module 78 may include DTMF. voice and decrypted data signals, the latter consisting of logic ones and zeros corresponding to caller identification data associated with the CLASS service to which the telephone customer subscribes. Other decrypted data includes directory information and communication protocol; contents are handshaking protocol first, data being sent out and then a checksum byte going out. The audio output is split into two paths, one being connected to a low pass filter 80 which passes voice signals and blocks the data signals. Voice signals output from the filter 80 are coupled to a compander 81 where the dynamic range of the signals is restored and then output to a speaker driver amplifier 82 through an attenuation control 83. An output from the amplifier 82 is connected to a speaker 84 of the handset where the voice signals are audibly reproduced.

Located between the junction of the attenuator 83 and the output of the compander 81, a manually operated volume control circuit is connected to circuit ground. The control circuit comprises a single pole, three position switch 86 that permits selectively switching resistors 87 and 88 from the attenuator 83 to circuit ground or, in the case of the third position 89, to open the circuit ground connection. The value of the resistor 87 or 88 switched into the control circuit will determine the signal input to the driver 82 with a consequent control of sound level at the speaker 84.

The second audio output path from the module 78 includes both voice signals and decrypted data transmitted from the transceiver 53 in the base 11. An MSK modem 95, which corresponds exactly with the modem 51 in the base 11, restores the decrypted data input thereto and produces a pulse train of received data that is input to a microprocessor 96 which corresponds to the microprocessor 39 in the base 11.

Both microprocessors function in the same manner under like software control. In the microprocessor 96, such software is resident in ROM 94 which corresponds to ROM 45. A comparison of the microprocessors 39 and 96 shows the similarities of circuit structure which are functionally identical in both the base and handset. Therefore, to understand the functional aspects of the circuit blocks associated with both microprocessors, it will be sufficient to refer to the microprocessor 39 in FIG. 2 and the description related thereto for a complete understanding of the microprocessor 96.

Figure 3:
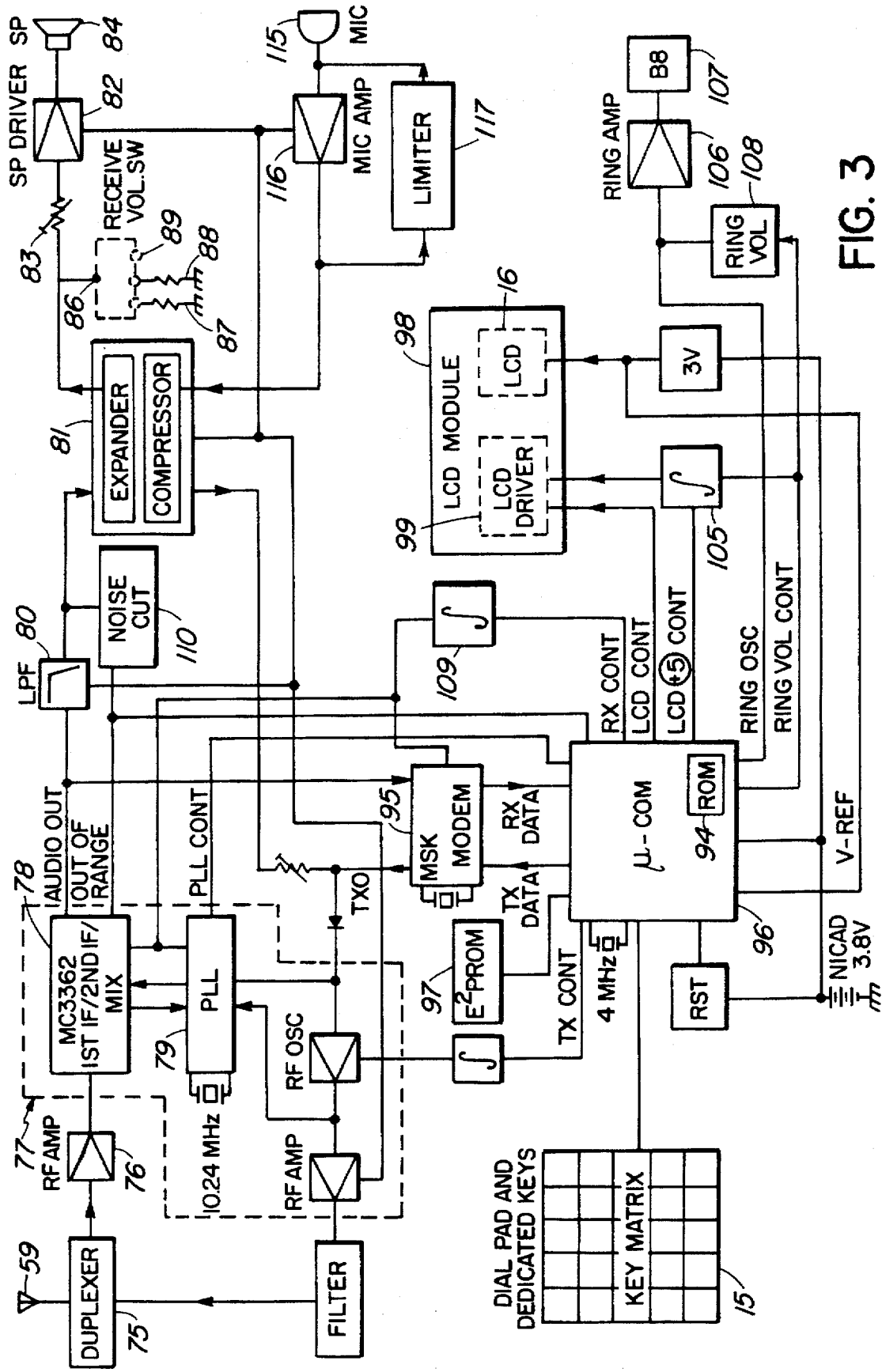
FIG. 3 is a block diagram of a cordless telephone handset shown in FIG. 1.

Certain differences are apparent in the microprocessor 96, however, particularly in the formatting and output of the received digital data which is connected via the microprocessor 96 to the screen 16, shown in FIG. 3 as a liquid crystal display (LCD) module 98 which includes an LCD driver 99 and the LCD screen 16. A related LCD output from the microprocessor 96 provides contrast control for the screen 16 by means of codes keyed in from the dialpad 15.

A further difference may be seen in a ring oscillator output from the microprocessor 96 which is applied to a ring amplifier 106 that drives an alerting transducer 107. A corresponding second output from the microprocessor 96 is a ring volume control signal which is input to a ring volume control circuit 108 that is bridged across the input of the amplifier 106.

Control of the modules 78, 79 and the modem 95 is effected by means of a receive control output that effects control of these components through a controller 109.

Should the handset 13 be carried beyond the range of its radio link with the base 11, an out of range indication is provided by the module 78. This comprises an out of range signal that is coupled to an input of a noise cut module 110 which is connected across the output of the filter 80 to mute noisy voice signals. The out of range signal is also connected to an input of the microprocessor 96 which, on reception of the signal, effects a disconnect under software control. The result is an output signal from the microprocessor 96 to the modem 95 which outputs a drive signal to the transceiver 77 that in turn transmits to the base 11 which is rendered on hook as illustrated in the flowcharts to follow.

Differences will also be noted in the circuitry associated with the speaker 84 and microphone 115 of the handset 13 when compared with the corresponding speaker 42 and microphone 46 of the base 11. A simpler circuit in the handset 13 is accounted for by the absence of a line transformer and hybrid circuit which are not required.

A microphone amplifier 116 and its limiter 117 correspond to the amplifier 68 and limiter 69 of the base 11. Functionally they are the same but because of the aforenoted differences in the speech paths between the base and handset, the amplifier 116 input and the limiter 117 output are connected directly to the microphone 115. The amplifier 116 output and the input of the limiter 117 however, are connected to the compander 81 which corresponds to the compander 70 in the base 11.

When voice and data signals are received at the base 11 from the handset 13, the voice switch 67, hybrid circuit 40, transformer 66 and hook switch 65 cooperate under control of the microprocessor 39 to connect the received voice signals to the line 30. Other features associated with the terminal 10 such as an intercom link between the handset and base as well as various features pertaining to dialing from both a dialpad and from memory and storing data into memory, will be understood by referring to the descriptions of such features together with corresponding flowcharts in the drawings.

Figure 4:
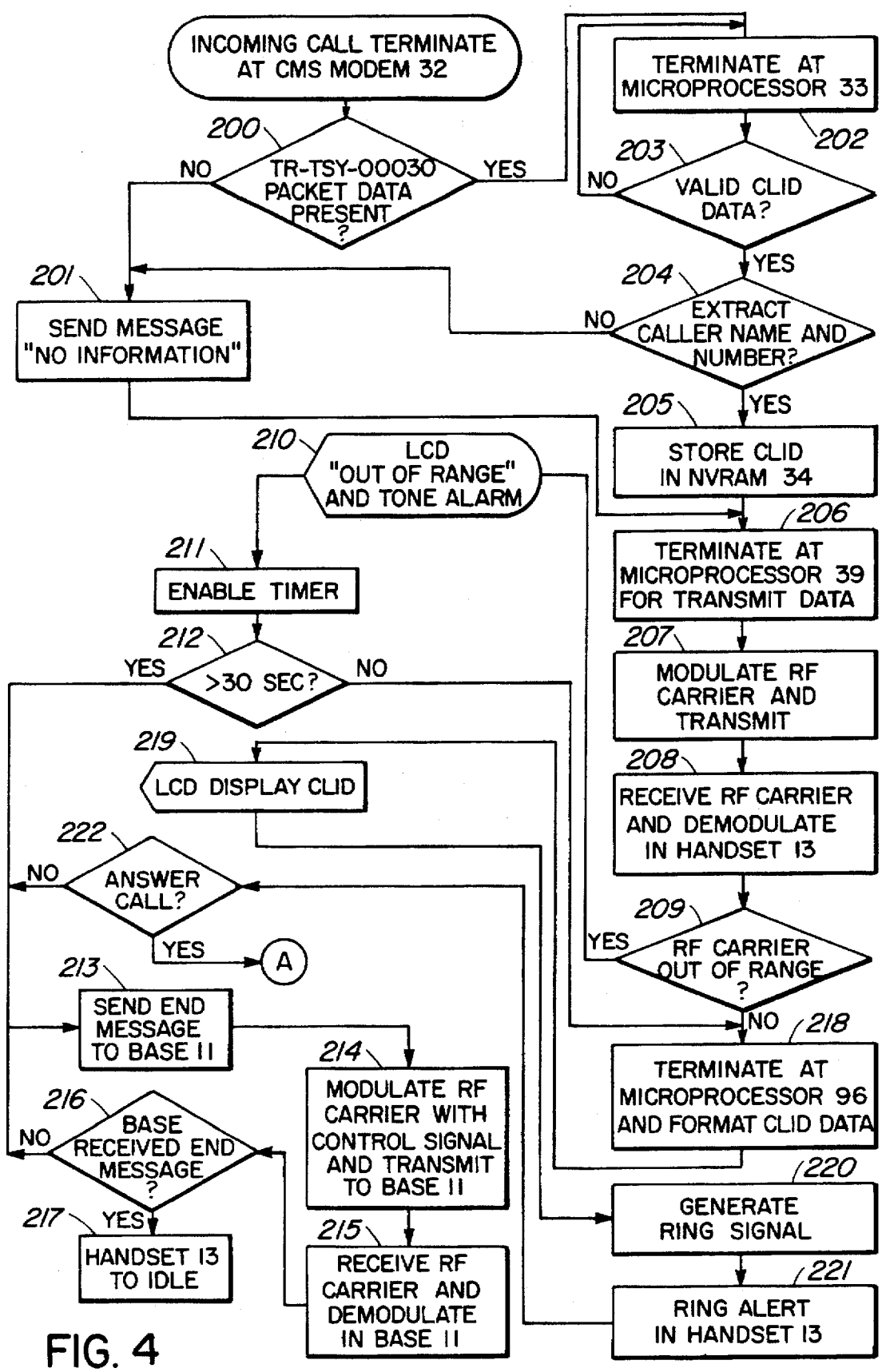
FIG. 4 is a flowchart illustrating a sequence of method steps for communicating voice and data signals between the base and handset of FIGS. 2 and 3.

FIG. 4 is a flowchart showing the various steps executed by the terminal 10 following receipt of an incoming call that is terminated at the modem 32. As indicated, a test block 200 determines if CLID packet data is present in accordance with Bellcore Technical References TR-TSY-00030 and TR-TSY-00031. In the event that such packet data is not present, a "No Information" message (block 201) is generated in the microprocessor 33 and is output therefrom along the bus 37 to the register 38 from which it is connected from the output 50 to modulate an RF carrier with subsequent transmission to the handset 13.

On the other hand, if packet data is present, it is terminated at the microprocessor 33 and subsequently tested for valid CLID data according to block 203. On determining the presence of valid data, a second test is indicated at a decision block 204 to ascertain whether caller identification has been extracted. Should the result be negative, the "No Information" message is sent as previously described. However, in the event caller identification data is present, such data is stored in a non-volatile NVRAM 34 which communicates in a known manner with its associated microprocessor 33 over an address and data bus 48 as shown in block 205.

A second bus 37 communicates the microprocessor 33 with the data input register 38 of the main microprocessor 39 of the base 11 which is indicated by the block 206.

Block 207 indicates the step of utilizing the transmission data at the output 50 to modulate the modem 51, the output of which is coupled to the input of the transceiver 53, as previously described, for subsequent modulation of the RF carrier and transmission to the handset 13.

Reception and demodulation of the RF carrier is indicated at block 208. It may be, however, that the handset 13 is out of range of the carrier from the base 11 which is determined in a decision block 209. In the event that the handset is out of range, as monitored by the module 110 (FIG. 3), an out of range signal is connected to the microprocessor 96 which responds with an out of range message retrieved from the EEPROM 97 and applied to the module 98 for display. Concurrently, a warning tone sounds. Both conditions are shown in the block 210. At this time the handset keypad 15 is inactive. If, within 30 seconds, the user improves the RF condition, the out of range condition is released and the terminal 10 returns to its pre-out of range state i.e., call is re-established or a feature session continues.

Block 211 shows that a timer is subsequently enabled and, as indicated in a decision block 212, if the poor RF condition persists for a time greater than 30 seconds, the handset 13 sends an END message to the base 11 and returns to an IDLE state i.e., the call is dropped or the feature session is exited provided the base 11 receives the END message. This sequence initiates in block 213 which sends the message to the base 11 followed by block 214 which indicates that the END message modulates the carrier which is then transmitted to the base 11. Block 215 follows with the step of receiving the RF carrier which is demodulated in the base, followed by a decision block 216 which tests whether the base 11 received the END message. As indicated, an affirmative reply takes the handset 13 to idle as shown in block 217.

In the event that the user returns the handset 13 within range of the RF carrier prior to timeout of the 30 second interval shown in block 212, the demodulated signal of the block 208 is terminated at the microprocessor 96 as shown in block 218 which includes the step of formatting the CLID data for display on the module 98 in accordance with the block 219. Concurrently, the microprocessor 96 generates a ring signal at the block 220 which is then applied as a ring alert in the handset 13 as shown in block 221. During the ring alert, a decision block 222 shows the result of an unanswered call, an END message being sent out from the block 213. A decision to answer the call, however, leads to a series of method steps illustrated in the flowchart of FIG. 5.

Figure 5:
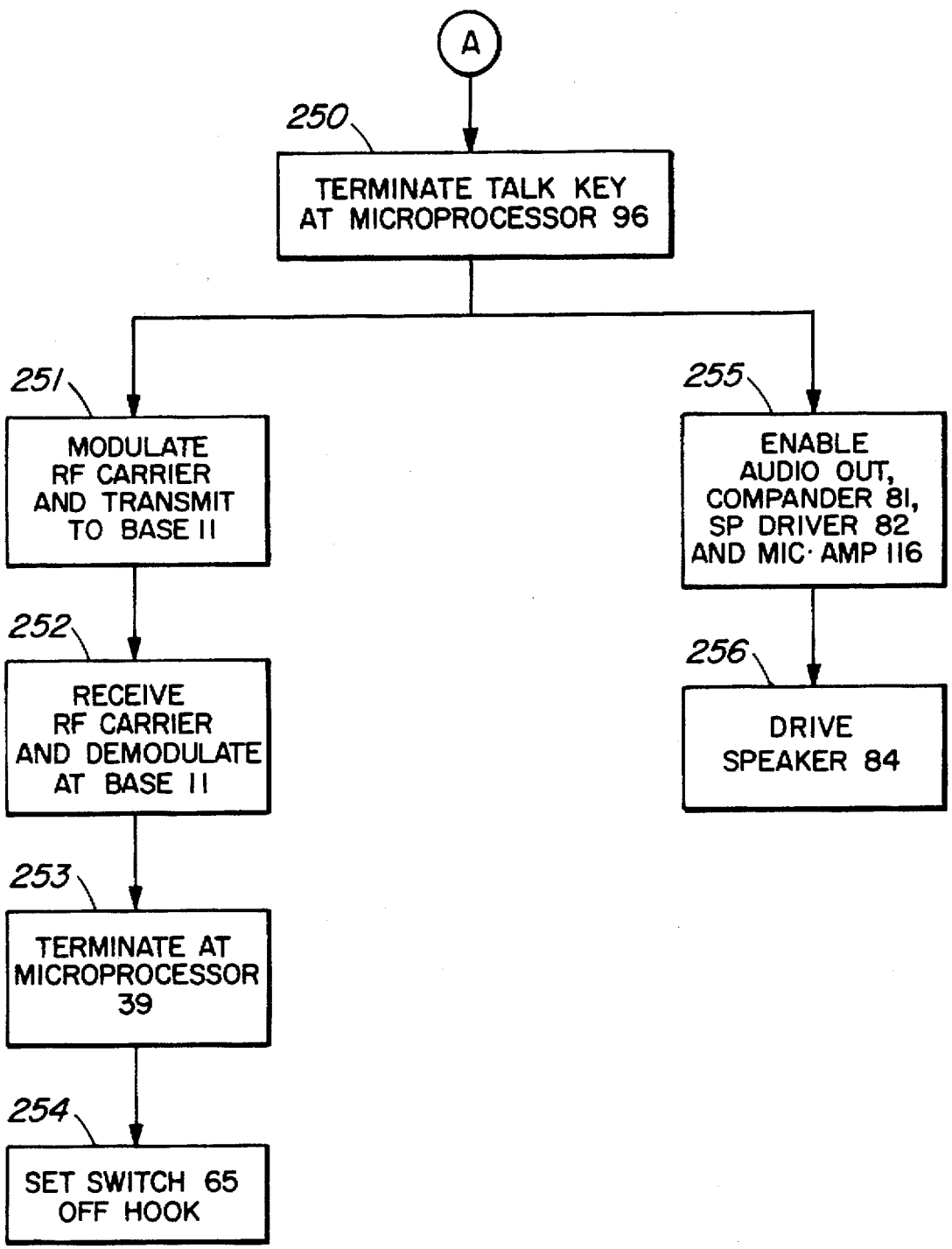
FIG. 5 is a flowchart illustrating a sequence of method steps for answering an incoming telephone call according to the invention.

An affirmative decision in the block 222 of FIG. 4 terminates at A which comprises the input for the flowchart of FIG. 5 wherein subsequent method steps are initiated. As shown in block 250, a dedicated TALK key 20 is pressed by the user to enable the microprocessor 96 which responds under stored instructions in the EEPROM 97. On the one hand, a control instruction from the microprocessor modulates the RF carrier in the transceiver 77 which is transmitted to the base 11 as indicated in block 251. The carrier is received and demodulated at the base 11 in accordance with the block 252 and is subsequently terminated at the microprocessor 39 in the base according to the block 253. Under instructions stored in the EEPROM 47, the microprocessor 39 sets the hook switch 65 to an offhook condition as shown in block 254, thereby connecting the primary winding of the transformer 66 to the terminal 31 and consequently to the line 30.

Concurrent with the RF carrier transmission of the block 251, a control signal output from the microprocessor 39 enables the audio output from the transceiver 77 and likewise enables the compander 81, the speaker amplifier driver 82 and the microphone amplifier 116 to render the handset 13 operational in accordance with blocks 255 and 256.

Figure 6A:
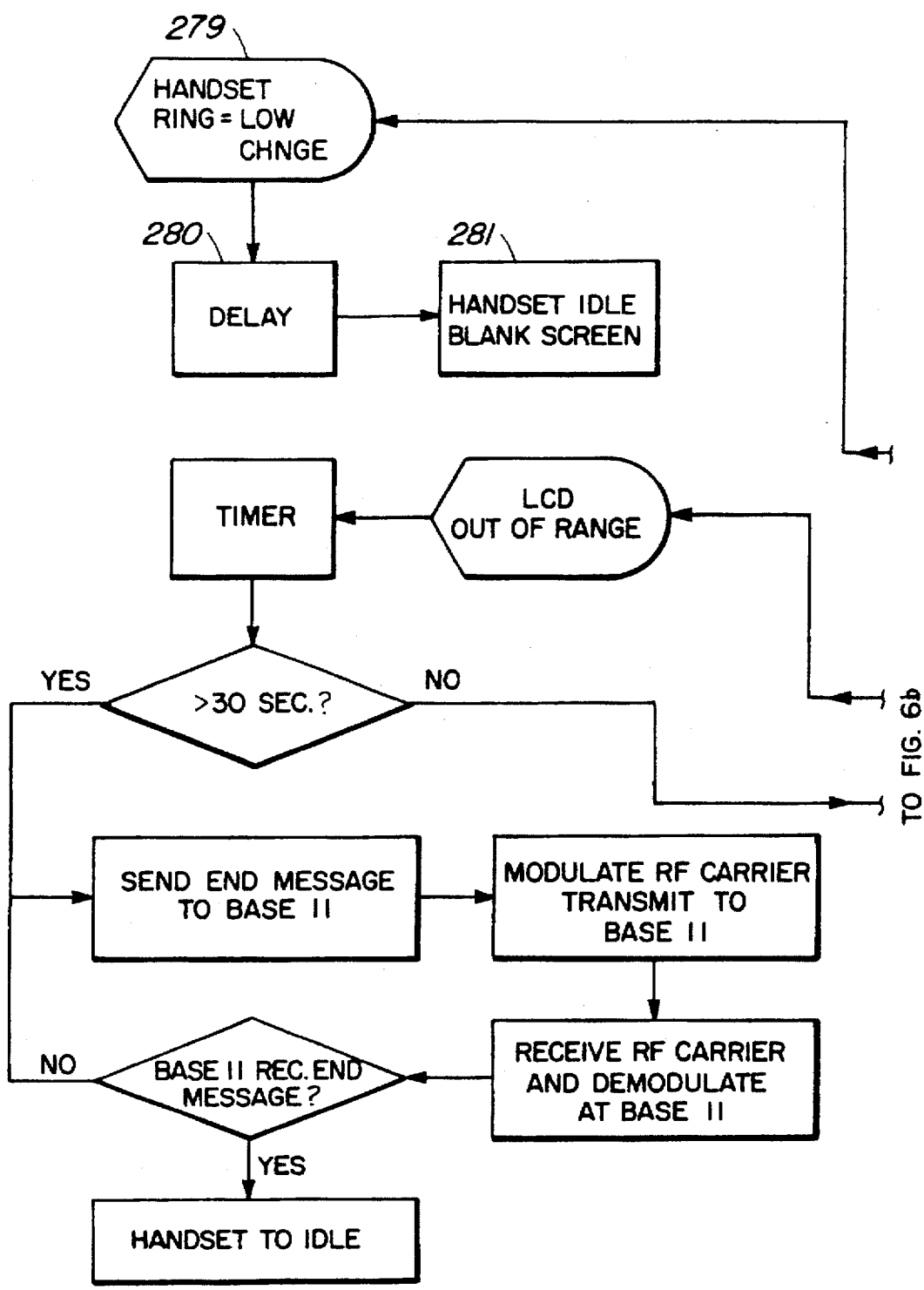
FIGS. 6a and 6b are flowcharts illustrating a sequence of method steps for predialing, storing and dialing a telephone number according to the invention.
Figure 6B:
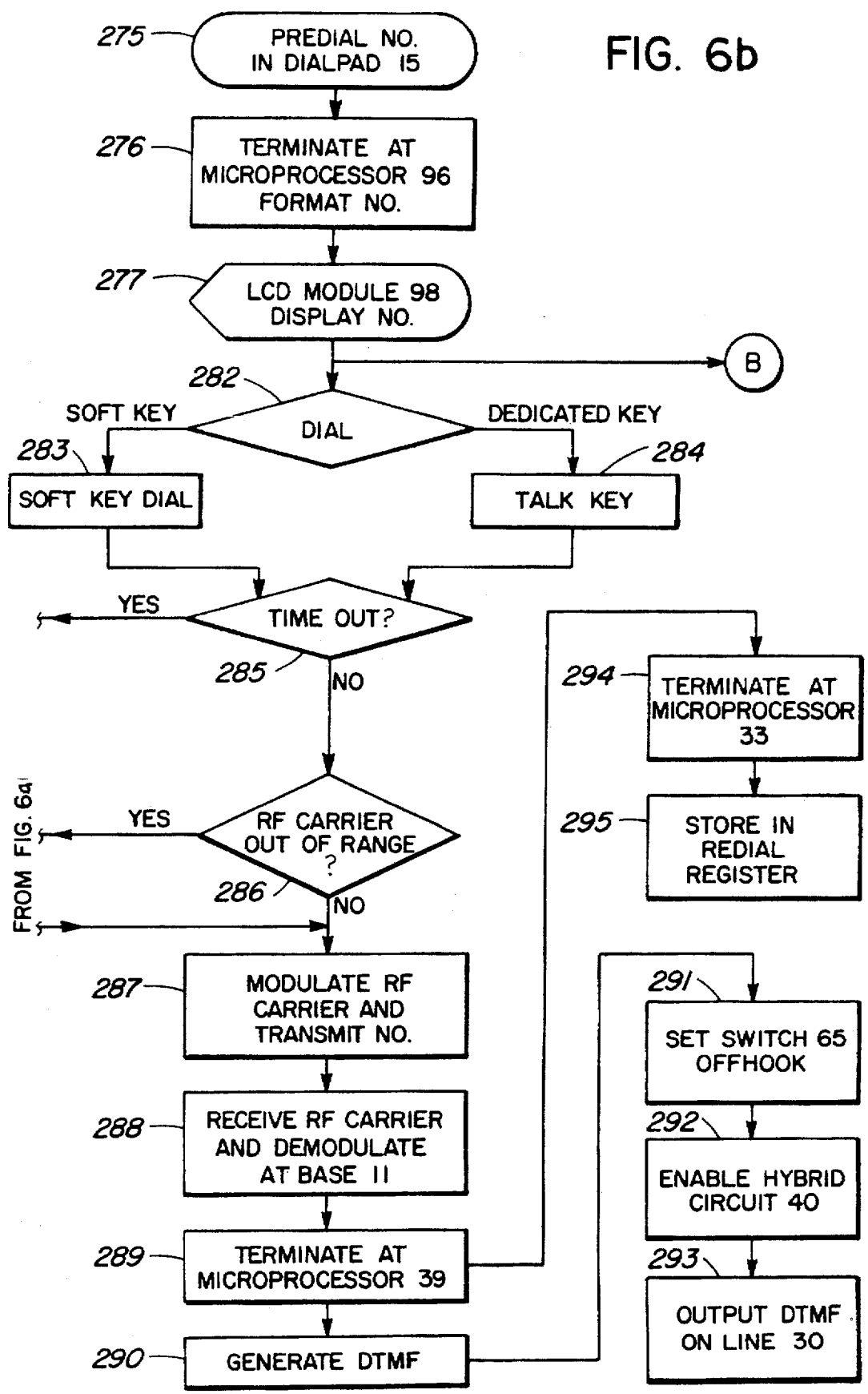

FIG. 6 is a flowchart illustrating two features of the invention embodied in the terminal 10. First is the capability of predialing a number on the keypad 15 of the handset and reviewing same on the screen 16 to ensure accuracy of the telephone number before actual dialing. A second feature is to save the number to a directory or a redial register. The method steps shown in FIG. 6 also illustrate the manner in which the number is dialed out from the terminal 10.

An input block 275 represents the step of predialing the number via the keypad 15. In accordance with block 276, the dialpad is scanned by the microprocessor 96 whereby individual key depressions are stored in an input buffer thereof and are subsequently formatted in accordance with instructions stored in the EEPROM 97, such formatting comprising the sequential spacing apart of the telephone number to be displayed by the module 98 in a format to which telephone users are accustomed. Thus, although a directory number may be entered from the keypad as a continuous flow of digits, the formatting performed by the microprocessor 96 introduces appropriate spaces between numbers. In conventional presentation form, each of the spaces between groups of numbers would be occupied by a dash or a hyphen. Following the formatting indicated in the block 276, the microprocessor 96 generates an LCD control signal which is connected to the driver 99 and therefrom to the screen 16 in accordance with the block 277.

The duration of timeout is arbitrary but, as previously noted, is set at 45 seconds in the present embodiment. In the event that the predialed number is displayed for a time greater than 45 seconds, the display is changed as indicated in the block 279. At this point in time the predialed number is lost and requires reentry from the dialpad. On initiation of the display shown in the block 279, a counter starts in accordance with block 280 and following an interval of 45 seconds the handset 13 is returned to idle and the screen 16 is blanked according to block 281.

The timeout interval of block 285 represents an interval during which a user may dial the number on display in block 277. This is indicated in the decision block 282 which shows that the number may be dialed either by striking a softkey associated with a DIAL user interactive prompt on the screen 16 or by striking the dedicated Talk key 20 in the keypad 15. In either event of dial initiation shown in blocks 283 and 284, a 45 second timeout procedure is initiated in block 285 as described hereinabove.

A subsequent test is shown in a decision block 286 wherein it is determined if the handset 13 is out of range from the base 11. In the event that the handset is out of range, the same procedure is followed as that illustrated and described in FIG. 4.

With the handset 13 in range, block 287 indicates that the microprocessor 96 generates a transmission data output to the modem 95 for modulation and therefrom to the transceiver 77 for transmission to the base 11.

The received carrier is demodulated in the base 11 as shown in block 288 and is subsequently terminated at the microprocessor 39 in accordance with block 289. The microprocessor 39 responds by generating a DTMF signal in accordance with the block 290 so as to set the hook switch 65 to its offhook state in accordance with the block 291. As previously described, the hybrid circuit 40 is enabled as indicated in block 292 and couples the DTMF signals through the transformer 66 to the terminal 31 and thence to the line 30 for connection to the central office which is representative of the block 293.

Concurrent with DTMF signal generation, the microprocessor 39 outputs the dialed number sequence over the data bus 37 to the microprocessor 33 according to block 294 where it is stored in a REDIAL register as indicated in block 295.

Figure 7:
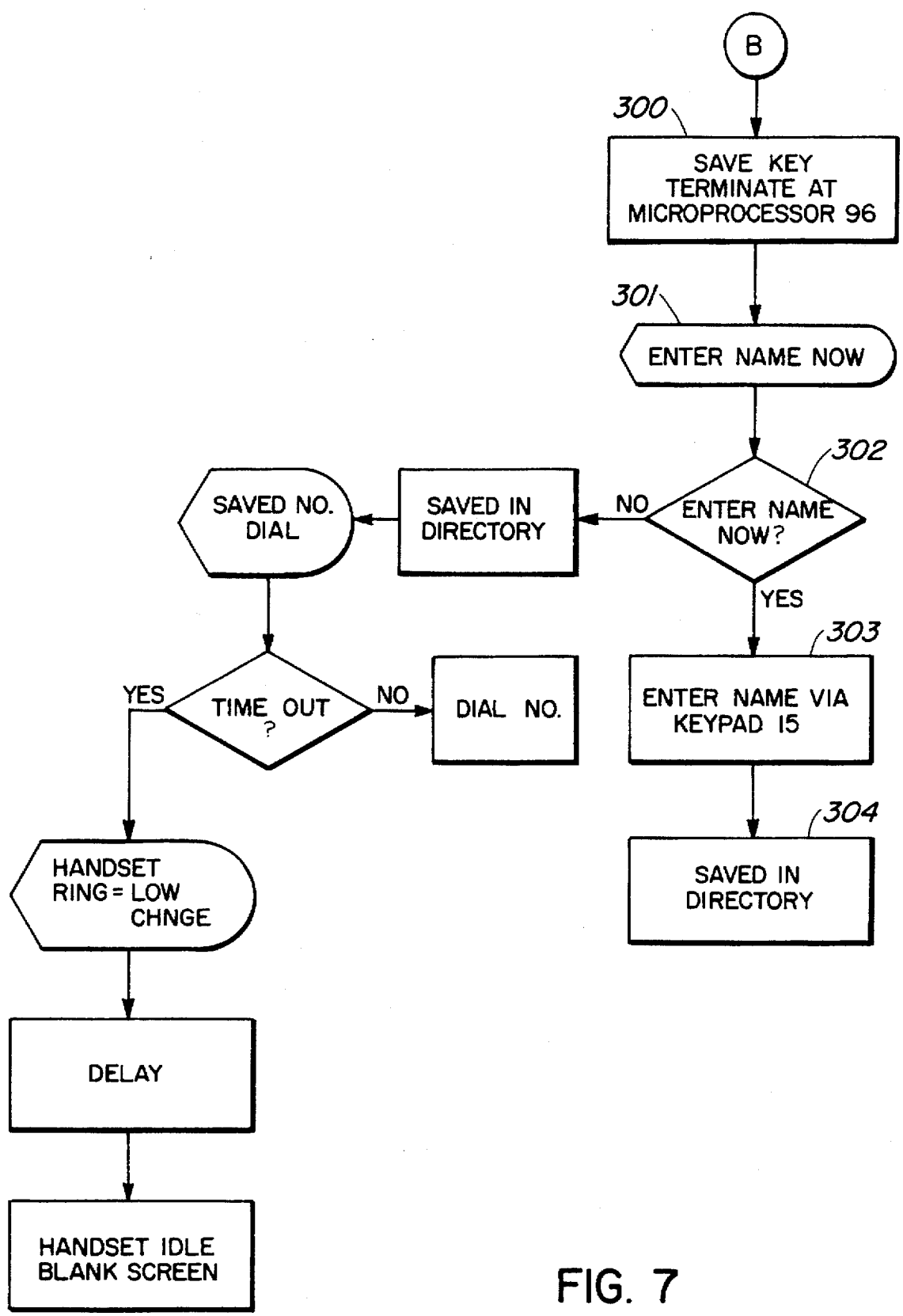
FIG. 7 is a flowchart illustrating a sequence of method steps for storing the predialed number of FIG. 6 in a general directory.

Terminal B in FIG. 6 is directed to a Save routine shown in FIG. 7. In accordance with this routine, block 300 indicates that the predialed number displayed on the screen 16 may be saved to a number directory by depressing a dedicated Save key on the handset 13. Thereafter the microprocessor 96 calls up a prompting message, ENTER NAME NOW, which is displayed on the screen 16 as indicated in block 301.

As shown in block 302, the user decides if the name is to be entered. An affirmative response from the user means that a name corresponding to the number may be entered via the keypad 15, block 303, following which the entered name is saved in a name field of the directory together with its corresponding number in a number field in accordance with block 304. Although the block 304 represents saving the name in a single step, it will be understood that this is a simplification of the several steps shown in FIG. 6 which indicate the steps following reception of the predialed number at the microprocessor 39 and subsequent storage of the number in the redial register at the microprocessor 33. In the case of storing the corresponding name, storage occurs in the nonvolatile memory NVRAM 34 in which the directory resides.

Figure 8A:
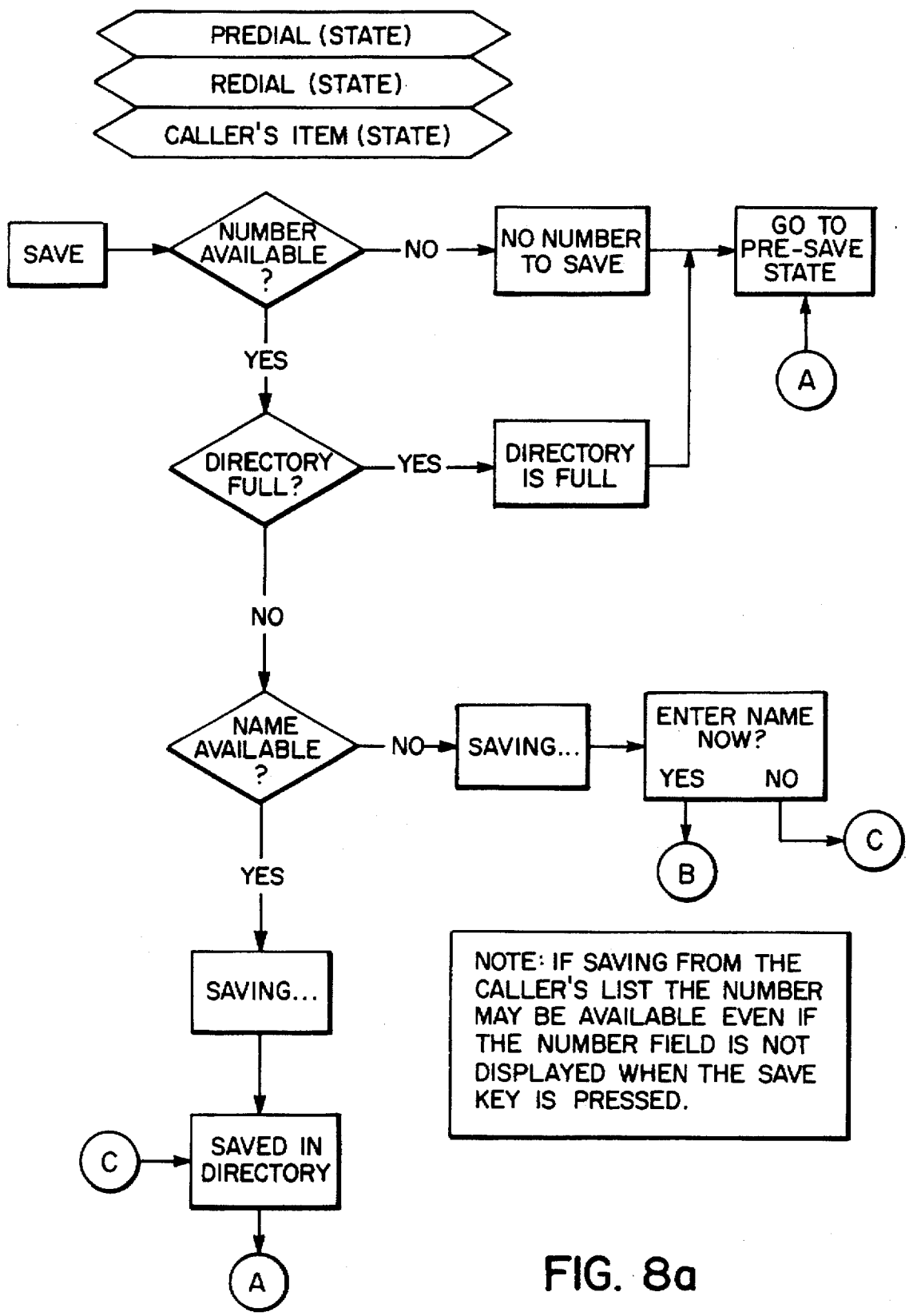
FIGS. 8a, 8b, and 8c are flowcharts illustrating data save sequences for various telephone states according to the invention.
Figure 8B:
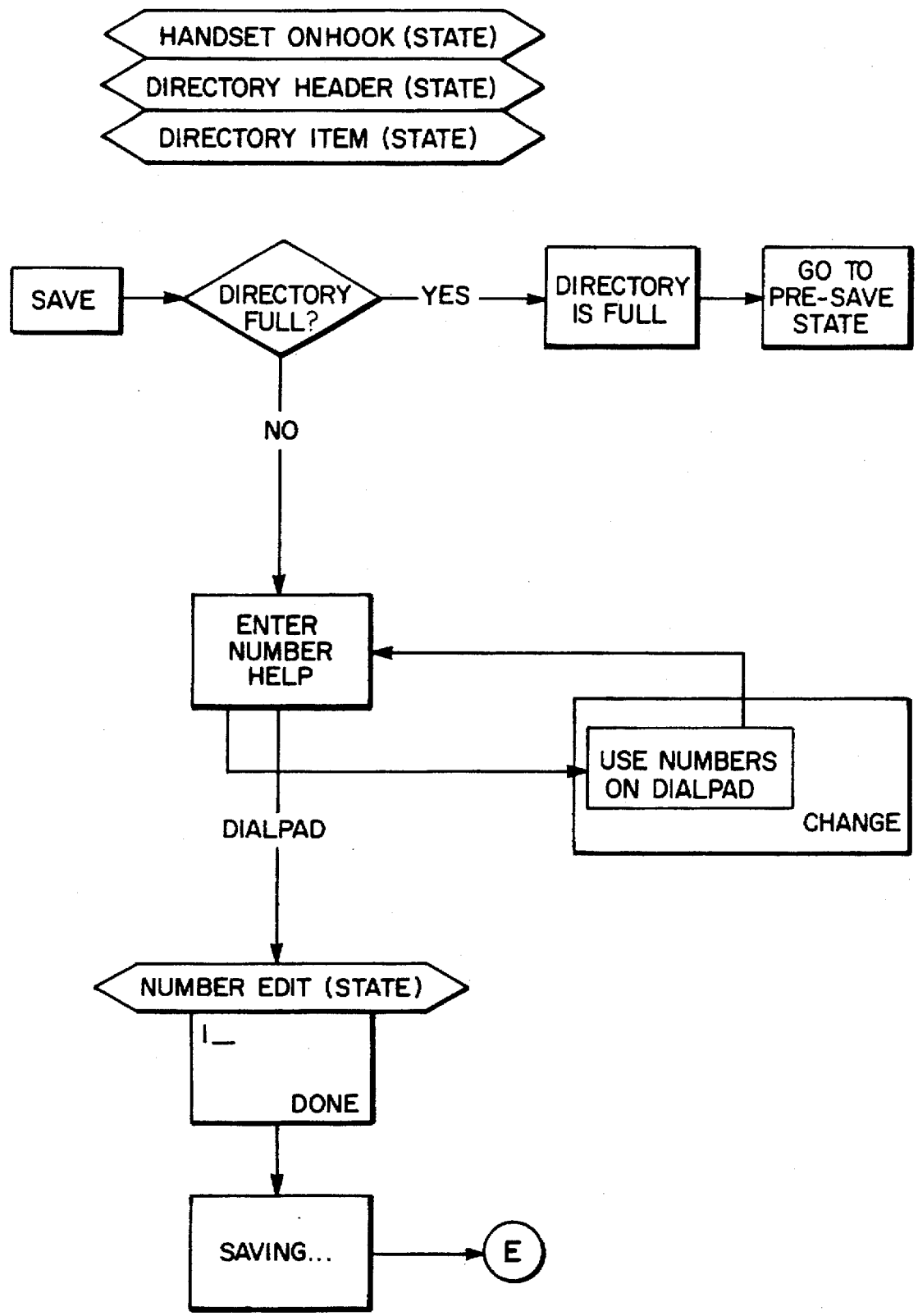

FIGS. 8a, b and c, are flowcharts illustrating various directory sequences for data storage which include Predial, Redial and Callers Item states. These flowcharts follow the description of the flowchart in FIG. 7 illustrating the required steps to save to the directory. Both names and numbers are stored in the directory. As described in FIG. 7, pressing the dedicated save key adds a new name and number to the directory wherein the names are listed alphabetically by the first word stored. By pressing dedicated scroll keys on the handset 13, the user can scroll through the items or use a dialpad search for a shortcut. The directory can be accessed using the handset 13 only.

The hardware associated with the directory comprises the microprocessor 96 in the handset 13 and microprocessors 33 and 39 in the base 11. As previously described, incoming data from CLID packets is received at the base and is transmitted to the handset where it is formatted by the microprocessor 96 and displayed on the screen 16. In order to save the displayed directory number, and name if available, the aforenoted dedicated Save key is depressed which initiates the procedure for saving the caller identification data to the nonvolatile NVRAM 34. The dialpad and dedicated keys of the handset 13 thus allow a user to interact with the directory feature over the radio link between the base and handset.

Information may be stored into the directory from a number of sources:

1) Pre-dialing using the dialpad as described;
2) Incoming CLID information;
3) Callers list item; and
4) Redial list item The directory feature is accessed by pressing a dedicated directory key or a dedicated save key as described. Once in the directory, the various items stored can be viewed by scrolling up or down or to the left or right by the dedicated scroll keys.

The maximum number of items in the directory is 30, although, as previously expressed, this is not a limiting quantity and may vary depending on the size of the memory used. Once inside the directory, the header format thereof is always the same. This format contains an item counter, which shows how many items are in the list. When the directory is empty, the header prompt shows "Directory=No Items".

Figure 8C:
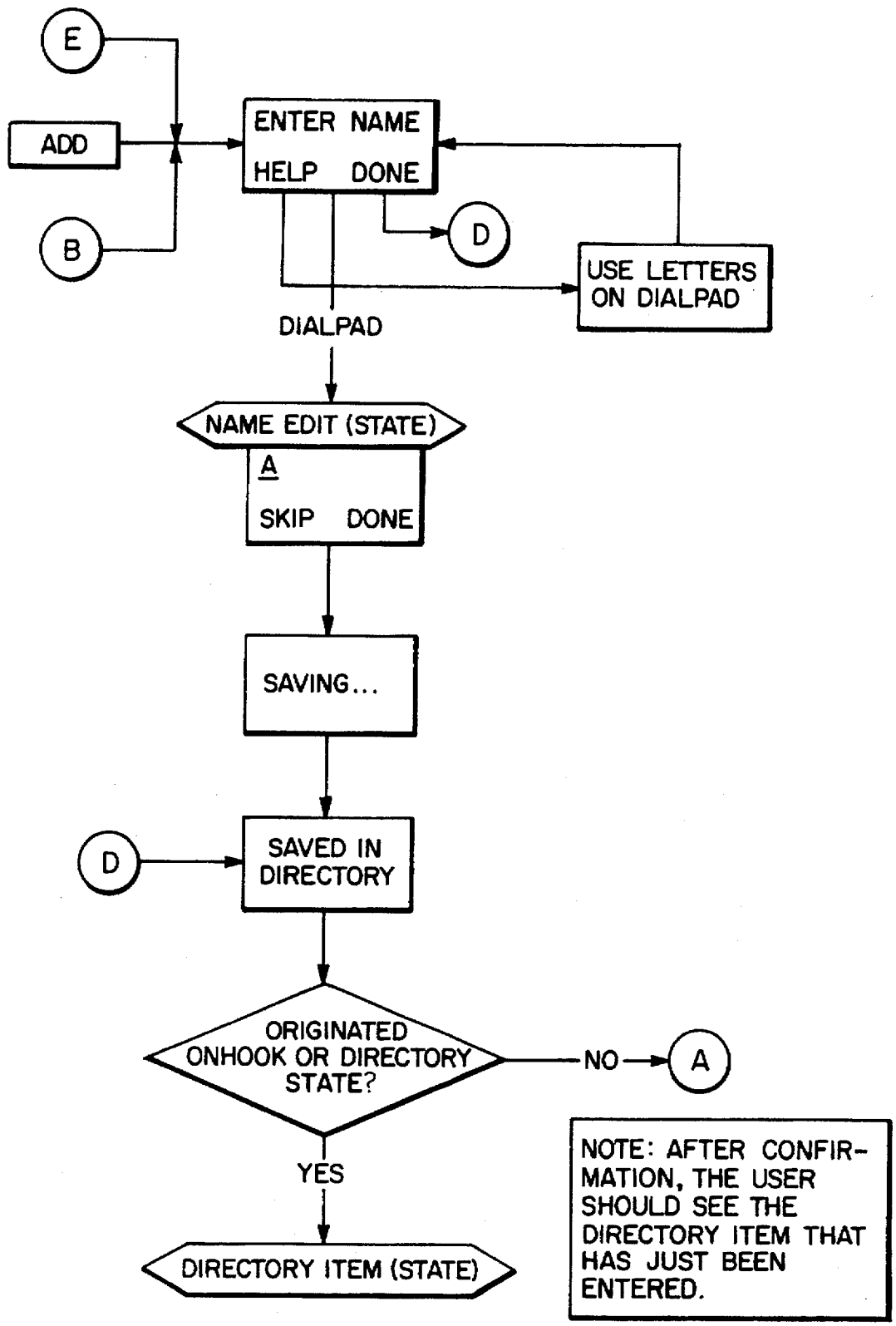

Directory items are entered by the user via the save sequence as described in FIG. 7, but since the directory is designed for both name and number items, stored in respective name and number fields, the user can choose to enter number only items. Number Only Items have a name field which contains the designation "No name". However, the user can choose to ADD (FIG. 8c) a name at any time. In the event of error introduction, both names and numbers can be edited by means of a position indicating cursor which locates an alphanumeric character, the dialpad 15 and a dedicated delete key on the handset 13. Alternatively, both names and numbers may be edited using a softkey appearing under the user interactive prompt CHNGE on the screen 16, an example of which is shown in the block 279 of FIG. 6.

Whenever the directory is not empty, the contents thereof may be accessed by pressing a dialpad key on the handset 13 while viewing the directory header. In so doing, a search shortcut is initiated. The shortcut feature permits the user to quickly search the directory by matching the characters on the dialpad key to the characters in the name field of a directory item and then jumping to that item. In general, a matching algorithm accepts a dialpad key character, which may be a letter, special character or digit, and looks for a match with the first character of the name. Directory items that do have names are sorted in alphabetical order according to the first character of the name string. Directory items having "No name" in the Name field are never searched from the dialpad. The following is an example of the shortcut search when the handset is in a Directory Header or Directory Item state:

IF key event=Dialpad
  Go to Directory item state
  Go to first Name item which matches the first character on the Dialpad key
  IF no match is found
    Show "<Character> No item entered"
REPEAT
IF next key event=same Dialpad key
  Go to first Name item which matches the next character on the Dialpad key
ELSE IF next key event=different Dialpad key
  Go to first Name item which matches the first character on the new Dialpad key
  IF no match is found
    Show 37 <Character> No Item entered"

As a clarifying example, consider that the user intends to find the name "Karen Sloan" in the directory. The first character of the name is "K". The letter "K" is the second character associated with the numerical dialpad key 5.

When the user presses the 5 key the first time, the message "J no item entered" prompt is displayed. There are no names beginning with "J" entered in the directory. However, when the user presses the 5 key again, the directory item that contains the first "K" Name—"Karen Sloan" is displayed.

The matching algorithm looks for all Names which begin with the letter "K". If more than one item "matches", i.e., if more than one Name has a first character which matches the dialpad search character, the user will be shown the first match which occurs in accordance with the directory order.

For example, if the user presses the 5 key twice, "Karen Sloan" is displayed. To view the other items whose Names begin with "K", the user must press the down arrow scrolling key. Pressing the up arrow scrolling key from "Karen Sloan" goes to the preceding alphabetically listed item.

Pressing the 5 key a third time enters the "L" items in the directory.

Figure 9:
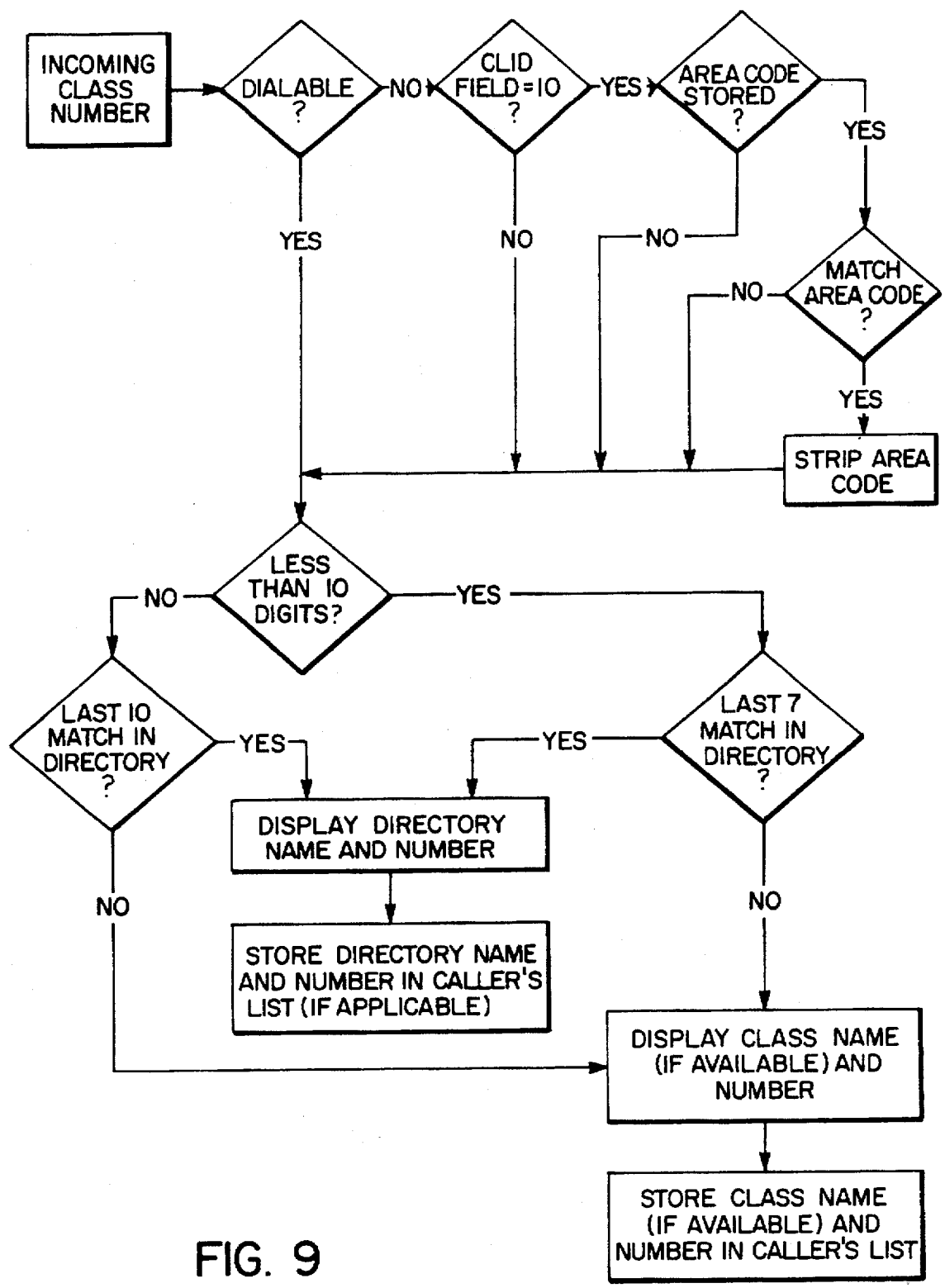
FIG. 9 is a flowchart illustrating a preferred name match sequence in a directory of received telephone calls.

FIG. 9 is a flowchart for preferred name matching through which identification of a caller is personalized. When incoming numbers arrive in a CLID packet, a match algorithm will search the directory for matching numbers. If a match is discovered, the name from the directory is displayed and stored in the callers list. The directory item's name field will be displayed if no name is received or it will replace any name that is received. It will be understood that matching occurs on the last ten digits of the directory item or the last seven digits depending on how many digits are received from the CLID packet. Having regard to FIG. 9, a preferred name match is performed in the following manner:

A) Determine whether the number is dialable or non-dialable.
  If the number is dialable (from CLASS Dialable directory number field), proceed to B below.
  If the number is non-dialable (from CLASS CLID field), check the area code stripping field. If there is an area code stored there, check the first 3 digits of the 10-digit non-dialable number.
  If there is a match, strip the area code from the non-dialable number, and proceed to B below.
  If there is no match, proceed to B with the non-dialable number intact.
B) Determine whether the number of digits in the string from A above has less than 10 digits, or 10 digits or more.
  There are four possible combinations of digit string:
    1. dialable, less than 10 digits
    2. dialable, 10 digits or more
    3. non-dialable, area code stripped, less than 10 digits
    4. non-dialable, 10 digits In cases 1 and 3 above, matching is performed on the 7 least significant digits, i.e., the 7 least significant digits of the string are compared to the 7 least significant digits of all directory numbers.

In cases 2 and 4 above, matching is performed on the 10 least significant digits, i.e., the 10 least significant digits of the string are compared to the 10 least significant digits of all directory numbers.

In either case, if there is a match, the user-entered directory item (name and number) is displayed during the incoming call and stored in the callers list if applicable.

It should be noted that "No name" items in the directory are not searched during the preferred name match. Therefore if there is no name stored with a matched number, only the number is shown on the incoming call. If a name is delivered from the CLID packet, the preferred name overwrites the delivered name in all cases.

The embodiments of the invention hereinabove disclosed rely on block diagrams to describe certain apparatus and various circuit elements together with their respective functions. Similarly, software functions are depicted by flowcharts of predetermined functional steps that are followed to achieve desired performance from the equipment described. These diagrams represent certain hardware and software features that would be known to those skilled in the art to whom this specification is addressed, although not in the novel combinations disclosed. Accordingly, the foregoing constitutes a sufficient description to such individuals for a comprehensive understanding of the best mode to give effect to the embodiments as disclosed and claimed herein. Although program listings have not been included to disclose the precise manner of digital computer programming to perform the operations desired, the detailed functional description presented herein, together with related flowcharts, would permit a skilled programmer to program the terminal 10 to perform all operations described.

To those skilled in the art to whom this specification is addressed, it will be apparent that the embodiments aforedescribed may be varied to meet particular specialized requirements without departing from the true spirit and scope of the invention disclosed. The foregoing embodiments are therefore not to be taken as indicative of the limits of the invention but rather as exemplary structures of the invention which is described by the claims appended hereto.

The embodiments of the invention in which an exclusive property or privilege is claimed are defined as follows:

1. Apparatus for displaying data and processing appearances thereof from an alphanumeric display screen of a cordless handset in user-interactive radio communication with an associated base station of a cordless telephone terminal in onhook communication with a telephone exchange, wherein said base station comprises a memory device, and wherein said memory device comprises first and second submemories, said apparatus comprising in combination:

means for generating predetermined command and alphanumeric data from selected ones of key operations at the handset;

means for enabling first processor means at the handset for displaying keyed alphanumeric data on the screen and concurrently transmitting the alphanumeric data and commands to the base station;

means for enabling second processor means at the base station for receiving the alphanumeric data and commands, retrievably storing the data in a first submemory of the base station and operably responding to the commands;

means for capturing service data from an incoming telephone call received at the base station;

means for testing the service data at the base station to confirm its validity;

means for retrievably storing the valid data in a second submemory of the base station and concurrently transmitting the valid data to the handset for display on the screen;

means for generating a set of user-interactive prompts having predetermined appearances on the display screen; and means for accessing individual ones of the first and second submemories via key operations at the handset corresponding to the user-interactive prompts for selectively processing and editorially revising the alphanumeric data stored in the submemories while under display screen observation.

2. Apparatus as claimed in claim 1, wherein the service data comprises digitally encoded calling line identification data including a caller's name, a directory number sequence, date and time of call.

3. Apparatus as claimed in claim 2, wherein the second submemory is a callers list memory at the base station.

4. Apparatus as claimed in claim 3, further comprising:

means for accessing the callers list memory;

means for selectively displaying the callers list memory contents; and means for processing the data displayed.

5. Apparatus as claimed in claim 4, further comprising:

means for accessing a directory memory at the base station and retrieving a header therefrom that indicates the number of items stored in the directory memory;

means for selectively displaying the directory memory contents; and means for processing the data displayed.

6. Apparatus as claimed in claim 5, further comprising:

means for accessing the name and directory number of a predetermined caller stored in the callers list memory;

means for storing the name and directory number of the accessed predetermined caller in the directory memory; and means for substituting a personalized name for the name of the predetermined caller stored in the directory memory.

7. Apparatus as claimed in claim 6, further comprising:

means for comparing the directory numbers of successive callers with the predetermined caller number stored in the directory memory; and means for overwriting each successive caller's identifying name in the callers list memory with the personalized name stored in the directory memory, displaying the personalized name on the screen and storing the personalized name in the callers list memory for each occurrence of a match between the caller's identifying directory number and the corresponding predetermined caller number stored in the directory memory.

8. Apparatus as claimed in claim 7, further comprising:

means for operating a softkey corresponding to a dial prompt for generating a dial command associated with a number appearance on the display screen;

means for transmitting the dial command to the second processor means for actuating a hook switch of the base station to render the base station offhook and active; and means for automatically dialing a number from a selected memory in the base station corresponding to the number appearance on the display screen.

9. Apparatus as claimed in claim 5, further comprising:

means for accessing a first alphabetical order of items stored in the directory memory; and means for scrolling through the selected alphabetical order to individually review and editorially revise selected ones of items stored therein by operating softkeys corresponding to predetermined ones of the user-interactive prompts.

10. Apparatus as claimed in claim 8, wherein the radio communication comprises a bidirectional radio link between the handset and the base station for full duplex data transmission.

11. Apparatus as claimed in claim 10, wherein half duplex radio communication between the base station and handset is performed via a first RF carrier signal transmitting continuously from a corresponding transmitter at the base station.

12. Apparatus as claimed in claim 11, further means for testing for the presence of a predetermined carrier signal level received at the handset from the base station, the presence of which enables half duplex radio communication between the handset and the base station via a second RF carrier.

13. Apparatus as claimed in claim 12, wherein the service data is captured between first and second ringing signals of the incoming telephone call.

14. Apparatus as claimed in claim 13, wherein the callers names are stored alphabetically in the callers list memory.

15. Apparatus as claimed in claim 14, further comprising means for formatting the caller's number data into a directory hyphenated form at the first processor means for display on the screen.

16. Apparatus as claimed in claim 15, wherein the handset includes a source of battery power and the continuous carrier signal is intermittently received at a predetermined rate that avoids loss or corruption of the transmitted service data and conserves battery power.

17. Apparatus for displaying data and processing appearances thereof from an alphanumeric display screen of a cordless handset in user-interactive radio communication with an associated base station of a cordless telephone terminal, comprising in combination:

means for generating predetermined command and alphanumeric data from selected ones of key operations at the handset;

means for enabling first processor means at the handset for receiving and operably responding to the handset data, displaying alphanumeric data on the screen and concurrently transmitting both command and alphanumeric data to the base station;

means for enabling second processor means at the base station for receiving, retrievably storing and operably responding to the transmitted handset data;

means for capturing digitally encoded calling line identification data from incoming telephone calls received at the base station, the station being onhook and the data including a caller's name and directory number sequence;

means for decoding and testing the captured data to confirm the validity thereof;

means for retrievably writing the confirmed data to a callers list memory at the base station and concurrently transmitting the confirmed data to the handset for display on the screen;

means for accessing a directory memory at the base station and selectively displaying the contents thereof on the handset screen;

means for writing the confirmed data of the callers list memory to the accessed directory memory;

means for substituting a personalized name input at the handset for a selected one of the names stored in the directory memory;

means for comparing the directory number sequences of subsequent callers with the number sequences stored in the directory memory; and means for overwriting a subsequent caller's identifying name stored in the callers list memory with the corresponding personalized name stored in the directory memory for each occurrence of coincidence between the caller's identifying directory number sequence and the same caller's number sequence stored in the directory memory.

18. Apparatus for displaying data and processing appearances thereof from an alphanumeric display screen of a key operated cordless handset in user-interactive radio communication with an associated base station of a cordless telephone terminal in onhook communication with a telephone exchange, wherein said base station comprises a memory device, and wherein said memory device comprises first and second submemories, said apparatus comprising in combination:

means for enabling first processor means at the handset for displaying keyed alphanumeric data on the screen and concurrently transmitting the alphanumeric data and commands to the base station;

means for enabling second processor means at the base station for receiving the alphanumeric data and commands, retrievably storing the data in a first submemory of the base station and operably responding to the commands;

means for capturing service data from an incoming telephone call received at the base station;

means for retrievably storing the service data in a second submemory of the base station and concurrently transmitting the service data to the handset for display on the screen; and means for accessing individual ones of the first and second submemories via key operations at the handset for selectively processing and editorially revising the alphanumeric data stored in the submemories while under display screen observation.

19. Apparatus for displaying data and processing appearances thereof from an alphanumeric display screen of a cordless handset in user-interactive radio communication with an associated base station of a cordless telephone terminal, comprising in combination:

means for capturing digitally encoded calling line identification data from incoming telephone calls received at the base station, the station being onhook and the data including a caller's name and directory number sequence;

means for decoding and testing the captured data to confirm the validity thereof;

means for retrievably writing the confirmed data to a callers list memory at the base station and concurrently transmitting the confirmed data to the handset for display on the screen;

means for writing the confirmed data of the callers list memory to a directory memory at the base station;

means for substituting a personalized name input at the handset for a selected one of the names stored in the directory memory;

means for comparing the directory number sequences of subsequent callers with the number sequences stored in the directory memory; and means for overwriting a subsequent caller's identifying name stored in the callers list memory with the corresponding personalized name stored in the directory memory for each occurrence of coincidence between the caller's identifying directory number sequence and the same caller's number sequence stored in the directory memory.

20. A method for displaying data and processing appearances thereof from an alphanumeric display screen of a key operated cordless handset in user-interactive radio communication with an associated base station of a cordless telephone terminal in onhook communication with a telephone exchange, wherein said base station comprises a memory device, and wherein said memory device comprises first and second submemories, said method comprising the steps of:

enabling first processor means at the handset for displaying keyed alphanumeric data on the screen and concurrently transmitting the alphanumeric data and commands to the base station;

enabling second processor means at the base station for receiving the alphanumeric data and commands, retrievably storing the data in a first submemory of the base station and operably responding to the commands;

capturing service data from an incoming telephone call received at the base station;

retrievably storing the service data in a second submemory of the base station and concurrently transmitting the service data to the handset for display on the screen; and accessing individual ones of the first and second submemories via key operations at the handset for selectively processing and editorially revising the alphanumeric data stored in the submemories while under display screen observation.

\* \* \* \* \*